US008373796B2

(12) United States Patent
Piek

(10) Patent No.: US 8,373,796 B2
(45) Date of Patent: Feb. 12, 2013

(54) DETECTING OCCLUSION

(75) Inventor: Matthijs C. Piek, 's-Hertogenbosch (NL)

(73) Assignee: Entropic Communications, San Diego, CA (US)

( * ) Notice: Subject to any disclaimer, the term of this patent is extended or adjusted under 35 U.S.C. 154(b) by 0 days.

(21) Appl. No.: 13/203,666

(22) PCT Filed: Feb. 26, 2010

(86) PCT No.: PCT/EP2010/052501
§ 371 (c)(1),
(2), (4) Date: Oct. 25, 2011

(87) PCT Pub. No.: WO2010/097470
PCT Pub. Date: Sep. 2, 2010

(65) Prior Publication Data
US 2012/0033130 A1    Feb. 9, 2012

(30) Foreign Application Priority Data

Feb. 27, 2009   (EP) .................................... 09250565

(51) Int. Cl.
*H04N 7/01*    (2006.01)
(52) U.S. Cl. ......................... 348/441; 348/452; 348/699
(58) Field of Classification Search ............... 348/441, 348/448, 451, 452, 458, 459, 443, 446, 620, 348/699–701; 375/240.16; *H04N 7/01, H04N 11/20, 5/21, 5/14*
See application file for complete search history.

(56) References Cited

U.S. PATENT DOCUMENTS

| 6,005,639 | A | 12/1999 | Thomas et al. | |
| 2005/0053292 | A1* | 3/2005 | Mukerjee et al. | ............. 382/236 |
| 2005/0157792 | A1 | 7/2005 | Baba et al. | |
| 2010/0045856 | A1* | 2/2010 | Chappalli et al. | ............. 348/441 |

FOREIGN PATENT DOCUMENTS

| WO | 96/28931 | 9/1996 |
| WO | 2005/022922 | 3/2005 |
| WO | 2005/027525 | 3/2005 |
| WO | 2007/063465 | 6/2007 |

OTHER PUBLICATIONS

Bellers et al., "Solving occlusion in Frame-Rate-up-Conversion", Consumer Electronics, 2007, ICCE 2007, Digest of Technical papers, International Conference on, IEEE, PI, Jan. 1, 2007, pp. 1-2.
Mertens et al., "Motion Vector field improvement for picture rate conversion with reduced halo", Proc. of the SPIE/IST VCIP, San Jose, Jan. 21-26, 2001, pp. 352-362.
Wittebrood et al., "Tackling occlusion in scan rate conversion systems", Digest of the ICCE'03, Jun. 2003, pp. 344-345.

* cited by examiner

*Primary Examiner* — Sherrie Hsia
(74) *Attorney, Agent, or Firm* — O'Shea Getz P.C.

(57) ABSTRACT

Common techniques for Motion Compensated Frame Rate Conversion (MC-FRC) suffer from occlusion which, if not taken explicitly into account, causes a visually disturbing artifact known as 'halo'. To solve this artifact, these regions have to be detected prior to performing interpolation. Several techniques exist to detect occlusion in a frame, but these are based on motion vectors, which are frequently unreliable. The invention relates to a method to detect occlusion by comparing match errors, thereby offering occlusion detection even when the motion vectors are incorrect.

9 Claims, 4 Drawing Sheets

DETECTING OCCLUSION

PRIORITY INFORMATION

This patent application claims priority from PCT patent application PCT/EP2010/052501 filed Feb. 26, 2010, which claims priority to EP patent application 09250565.0 filed Feb. 27, 2009, both of which are hereby incorporated by reference.

FIELD OF THE INVENTION

The invention relates to detection of occlusion regions for motion-compensated frame rate up-conversion of video sequences.

BACKGROUND OF THE INVENTION

When playing back a video from a storage medium to a display, such as a video stored on a digital versatile disc (DVD) played on a television screen, the frame rate of the display may be greater than that of the source material. Many modern televisions allow for an increased frame rate, which may for example be 100 Hz, whereas the source material may have a frame rate of 50 Hz or less. This higher frame rate can reduce the flicker that may otherwise be apparent to a user.

One technique for up-scaling the frame rate, for example from 50 Hz to 100 Hz, would be simply to repeat input frames in the output video signal. This technique, however, does not smooth out motion in the video and can result in visual artifacts becoming apparent as jerkiness in the up-scaled display.

Motion compensated frame rate up-conversion techniques are therefore typically used to increase frame rates, while attempting to reduce such artifacts. Such motion compensation involves intermediate frames being generated by interpolation between successive input frames. By estimating motion vectors for blocks in successive input frames, portions of the input frames that correspond to moving objects can be translated to intermediate positions in the interpolated frames. This results in motion being apparently smoothed out in the output video sequence.

The quality of interpolated images in picture rate up-conversion is predominantly dependent on the accuracy of the motion vector fields. Block-based motion estimation techniques typically result in incorrect vectors in occlusion regions, which leads to so-called halo effects in an up-converted video sequence. This can occur when a foreground object in the video sequence is passing in front of a background object. Either one or both of the foreground and background objects may be moving relative to the boundary of the video frames. In the case of a static camera filming a moving object, the foreground object moves against a static background. In the alternative, a moving foreground object may be tracked, resulting in an apparently moving background. Combinations of these situations are also common.

When a foreground object changes position from a first frame to a second frame, an area in front of the object, that is to say immediately adjacent the edge of the object (to the right of the object, if moving from left to right) is occluded in the second frame, and a further area behind the object (to the left of the object, if moving from left to right) is revealed in the second frame. Such areas are known as occlusion areas or regions, and are characterized as uncovering occlusion regions and covering occlusion regions. By definition, uncovering occlusion regions are those parts of a frame that were not present in a previous frame, typically the immediately preceding frame, while covering occlusion regions are those parts of a frame that are not present in a subsequent frame.

The presence of occlusion regions results in common techniques for motion compensated frame rate conversion creating artifacts in the output up-scaled video known as halo effects. A halo effect is caused when an interpolated frame displays a portion of an occlusion region incorrectly, due to the inability of the conversion technique to determine the correct image data to use in the case of an interpolated occlusion area. Various different techniques have been proposed to solve this occlusion problem, with varying degrees of success, as for example disclosed in the references (i) M. Mertens and G. de Haan, entitled "*Motion Vector Field Improvement for Picture Rate Conversion with Reduced Halo*", Proc. of the SPIE/IST VCIP, San Jose, 21-26 Jan. 2001, pp. 352-362 (ii) R. B. Wittebrood, G. de Haan and R. Lodder, entitled "*Tackling Occlusion in Scan Rate Conversion Systems*", Digest of the ICCE'03, June 2003, pp. 344-45 and (iii) WO 96/28931 entitled "Motion-compensated Interpolation". However, none of the proposed techniques achieve the desired combination of a large reduction of halo artifacts together with an adequate robustness to the different types of input material that might be encountered.

In the publication by E. B. Bellers, J. W. van Gurp, J. G. W. M. Janssen, R. Braspenning, R. Witterbrood, entitled "*Solving Occlusion in Frame Rate Up Conversion*", Digest of International Conference on Consumer Electronics, January 2007, pp. 1-2, a further technique is disclosed dealing with occlusion regions. In general terms, this technique comprises five main steps:
1: Estimate, for the previous and current video frames, the forward and backward motion vectors;
2. Combine each pair of motion fields to form an occlusion-free motion vector field;
3. Generate an interpolated ('retimed') vector field in-between the two combined vector fields;
4. Determine the occlusion area and occlusion type (i.e., covering or uncovering); and
5. Perform interpolation according to retimed motion vector field and occlusion mask.

WO 2005/027525 entitled "Motion Vector Field Re-timing" and WO 2005/022922 entitled "Temporal Interpolation of a Pixel on Basis of Occlusion Detection" disclose methods of performing steps 3 and 4. In all known techniques, detection of occlusion in video frames is an essential step. This step can be performed implicitly or explicitly. In the publication by R. B. Wittebrood et al identified above, a implicit detection technique is proposed, comprising the following steps:
1. Find the occlusion area;
2. Determine the occlusion type;
3. Calculate the background motion vector; and
4. Perform a robust up-conversion using the occlusion type and background motion vector.

The techniques disclosed in the publication by R. B. Wittebrood et al, as well as in references WO 2005/027525, WO 2005/022922 and WO 2007/063465 entitled "Motion Vector Field Correction" seek to determine a mismatch between estimated motion vectors to detect occlusion, and/or to relate the magnitude of a match error (sometimes called a residue) to an amount of occlusion.

Such known methods of explicit occlusion detection are, however, not ideal. Determining a mismatch suffers from the frequent occurrence of poor motion vectors, whereas relating the magnitude of a match error to an amount of occlusion suffers from the fact that the absolute match error relates poorly to the presence of occlusion. For example, a good match in high contrast areas might provide a higher match error than a poor match in occluded areas with low contrast. Failure in occlusion detection frequently means subsequent steps in the algorithm will fail, thereby leading to visually annoying artifacts in the resulting interpolated image.

The listing or discussion of a prior-published document in this specification should not necessarily be taken as an acknowledgement that the document is part of the state of the art or is common general knowledge.

There is a need for an improved method of occlusion area detection and identification, in particular to improve the robustness of such detection and identification.

SUMMARY OF THE INVENTION

In accordance with a first aspect of the invention there is provided a method of detecting occlusion areas in a sequence of video frames comprising a current frame, a first previous frame and a second previous frame, each frame comprising a plurality of blocks, the method comprising:

estimating a forward motion vector field for the first previous frame between blocks in the first previous frame and the current frame;

estimating a backward motion vector field for the first previous frame between blocks in the first previous frame and the second previous frame;

generating forward match errors between blocks in the first previous frame and blocks in the current frame corresponding with the forward motion vector field;

generating backward match errors between blocks in the first previous frame and blocks in the second previous frame corresponding with the backward motion vector field;

identifying blocks in the first previous frame for which the forward match error is greater than the backward match error as covering occlusion areas; and identifying blocks in the first previous frame for which the backward match error is greater than the forward match error as uncovering occlusion areas.

According to a second aspect of the invention there is provided an image processing apparatus comprising an up-converter for up-converting an input video sequence comprising a current frame, a first previous frame and a second previous frame, each frame comprising a plurality of blocks, the up-converter comprising:

a forward estimator for estimating a forward motion vector field for the first previous frame between blocks in the first previous frame and the current frame;

a backward estimator for estimating a backward motion vector field for the first previous frame between blocks in the first previous frame and the second previous frame;

a forward match error generator for generating forward match errors between blocks in the first previous frame and blocks in the current frame corresponding with the forward motion vector field;

a backward match error generator for generating backward match errors between blocks in the first previous frame and blocks in the second previous frame corresponding with the backward motion vector field;

a first identifier for identifying blocks in the first previous frame for which the forward match error is greater than the backward match error as covering occlusion areas; and a second identifier for identifying blocks in the first previous frame for which the backward match error is greater than the forward match error as uncovering occlusion areas.

The use of the match error according to the invention in determining the presence of occlusion improves reliability by replacing an absolute match error comparison, used in previous techniques, with a relative match error comparison. This is made possible by the use of two motion vector fields simultaneously, in the form of a backward motion vector, i.e., from the first previous frame to a second previous frame, and a forward motion vector, i.e., from the first previous frame to the current frame.

A solution provided by the invention works by comparing the match error using of the backward motion vector field with the match error using the forward motion vector field. This is based on the fact that it is impossible to estimate vectors in uncovering occlusion regions in a backward estimation and it is also impossible to estimate motion vectors in covering occlusion regions in a forward estimation. This impossibility is reflected in the difference between the match errors.

For a block corresponding to an uncovering occlusion region, the match error in the backward motion vector estimation will be significantly higher than the match error in the forward motion vector estimation. In the alternative, for a block corresponding to a covering occlusion region, the match error in the forward motion vector estimation will be significantly higher than the match error in the backward motion vector estimation. By comparing these two errors with respect to each other, the sensitivity to the contents of the block (e.g., whether high or low contrast) is greatly reduced, thereby improving the robustness of the occlusion detection method.

This effect also holds when the motion estimator mistakenly estimates a background vector where a foreground vector should be and vice versa. Hence, this provides an easy and reliable way to detect occlusion independent of the quality of the motion estimator.

Advantageously, embodiments of the present invention provide improved robustness to motion estimation errors. This results in a visually more pleasing output image, when the invention is used as part of a motion compensated frame rate up-conversion process.

As described above, common techniques for Motion Compensated Frame Rate Conversion (MC-FRC) suffer from occlusion which, if not taken explicitly into account, causes a visually disturbing artifact known as 'halo'. To solve this artifact, these regions have to be detected prior to performing interpolation. Several techniques exist to detect occlusion in a frame, but these are based on motion vectors, which are frequently unreliable. An aspect of the invention relates to a method to detect occlusion by comparing match errors, thereby offering occlusion detection even when the motion vectors are incorrect.

These and other objects, features and advantages of the present invention will become more apparent in light of the following detailed description of preferred embodiments thereof, as illustrated in the accompanying drawings.

BRIEF DESCRIPTION OF THE DRAWINGS

The invention will now be described by way of example only, and with reference to the appended drawings in which.

DETAILED DESCRIPTION OF THE INVENTION

Figure 1:
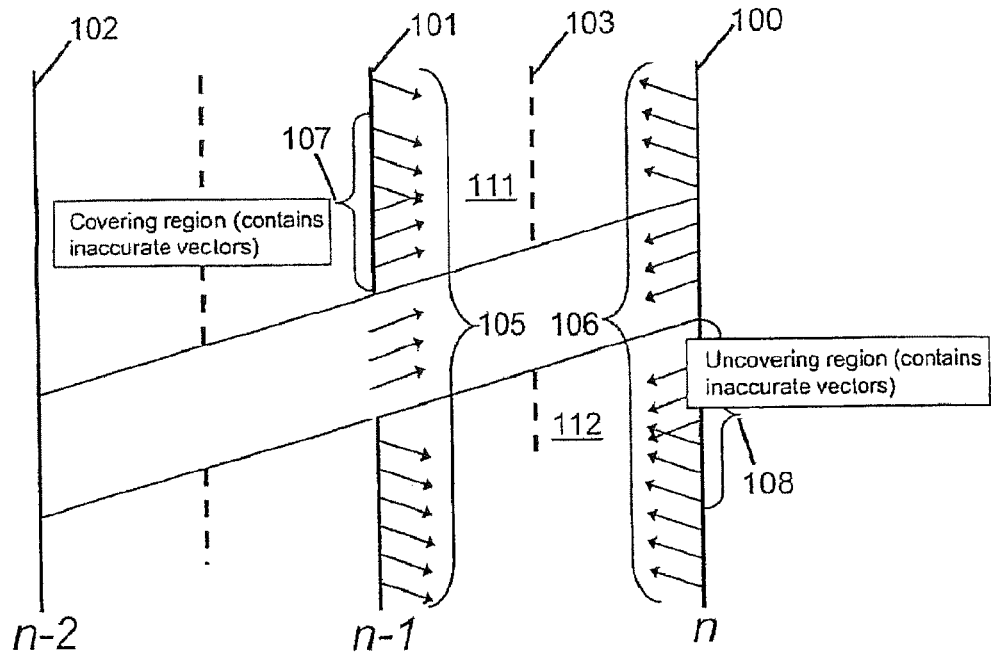
FIG. 1 is a schematic illustration of motion estimation from a previous frame towards a current frame and from the current frame towards the previous frame.

FIG. 1 schematically illustrates performing motion estimation from a first previous (n-1) frame 101 towards a current (n) frame 100, in a temporal sequence of video frames 100, 101, 102. A motion estimation vector field is derived for the first previous (n-1) frame 101 towards the current frame 100, resulting in a 'previous-forward' estimated motion vector field 105 for the first previous frame 101. A further motion estimation vector field is derived for the current (n) frame 100 towards the first previous (n-1) frame 101, resulting in a 'current-backward' estimated motion vector field 106. These motion estimation vector fields 105, 106 can be used to derive a temporally intermediate frame 103, in which the position of blocks in the intermediate frame are derived by interpolation from the motion vector fields 105, 106 and the corresponding blocks in the current and previous frames 100, 101.

Both vector fields, 105, 106, however, suffer from occlusion problems, as indicated by regions 107, 108 in which motion vectors are inaccurate and therefore unreliable. In the uncovering region 108, backward motion vectors are unreliable because the blocks in this region do not have corresponding blocks in the first previous frame 101. In the covering region 107, the forward motion vectors are unreliable because blocks in this region do not have corresponding blocks in the current frame. A typical motion vector estimation technique will attempt to match blocks in successive frames by finding blocks within a limited region around a current block that has a minimum mismatch. Using such motion vectors to generate the intermediate frame 103 when such uncovering and covering regions are present can result in halo effects becoming apparent in the uncovering and covering occlusion regions, which in FIG. 1 correspond to triangular areas 111, 112.

Figure 2:
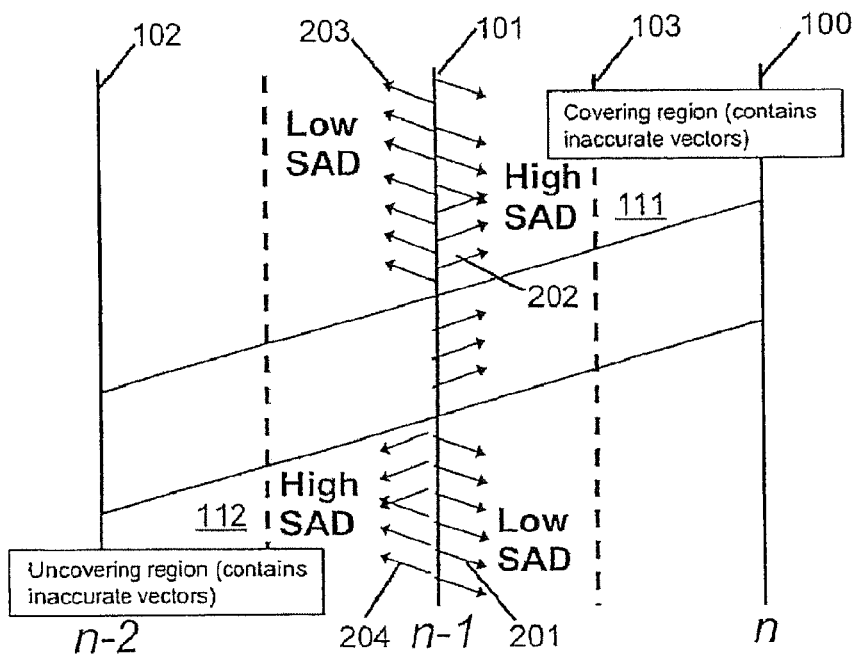
FIG. 2 is a schematic illustration of match errors of motion estimation from a previous frame towards a current frame and for motion estimation from the previous frame to a second previous frame.

A common match criterion used for estimation of motion vectors is to calculate the sum of absolute differences (SAD) between a current block and a range of candidate blocks in an adjacent frame. A candidate motion vector is chosen according to the minimum resulting SAD. FIG. 2 schematically illustrates a comparison between previous-forward SAD errors with previous-backward SAD errors. Forward motion vectors 201, 202 are calculated by determining the minimum SAD errors for blocks in the first previous frame 101 compared with blocks in the current frame 100. Backward motion vectors 203, 204 are calculated by determining the minimum SAD errors for blocks in the first previous frame 101 compared with blocks in the second previous frame 102. As shown in FIG. 2, motion vectors 201, 203 in regions where there is no covering or uncovering occlusion will tend to have a lower SAD error than motion vectors 202, 204 in regions where there is a covering occlusion (region 111) or an uncovering occlusion (region 112).

By determining the difference between the forward and backward errors for motion vectors calculated according to the above method, and comparing this difference to a threshold, a more robust method of occlusion detection is enabled.

Although SAD is a typical known method of determining the residual errors between blocs in successive frames, other calculation techniques may also be used.

The method would typically be carried out on a block basis, each block being a collection, or array, of individual pixels. A typical block may comprise an 8×8 array of pixels. Other block sizes may, however, be used. In the extreme case, each block may be as small as a single pixel.

Figure 3:
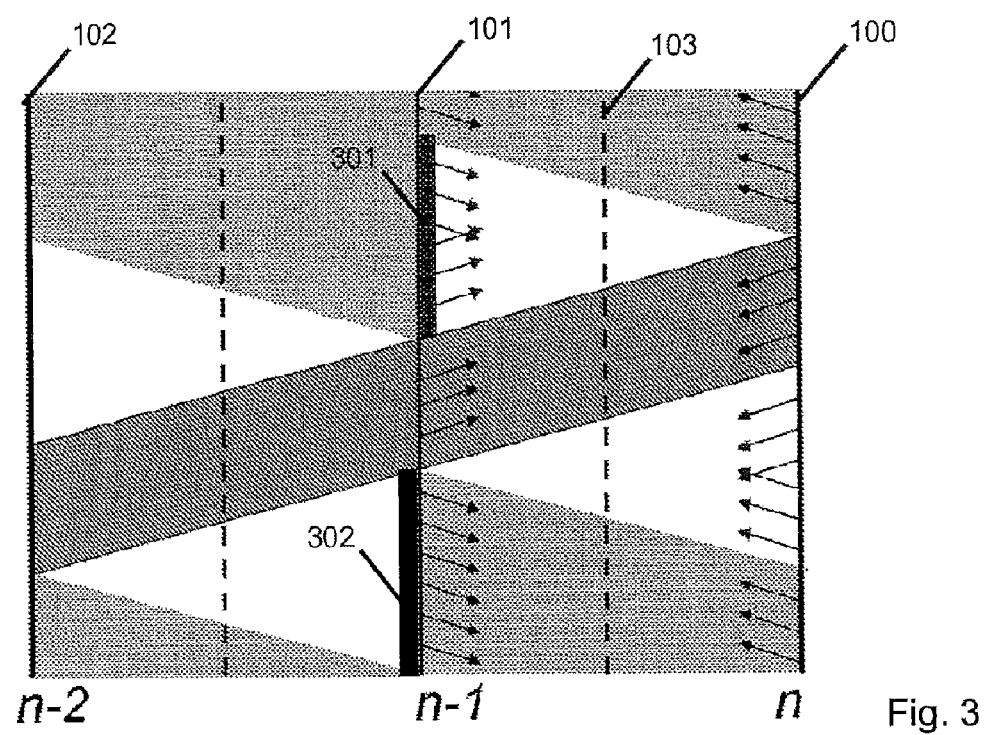
FIG. 3 is a schematic illustration of identified occlusion areas in a previous frame.

FIG. 3 schematically illustrates an occlusion mask for the first previous frame, determined from the above described method of comparing SAD errors for forward and backward motion vectors. A first region 301 is determined to be a covering occlusion region, and a second region 302 is determined to be an uncovering occlusion region. Remaining regions in the first previous frame 101 are determined not to be occlusion regions, and the blocks in the interpolated frame 103 can be calculated according to known methods.

Once the occlusion regions are determined, a further part of the video up-scaling process is then employed to determine appropriate blocks to be used in generating the interpolated frame 103. For example, for uncovering regions 302, blocks from the current frame would preferably be used in generating the interpolated frame 103, whereas for covering regions 301, blocks from the first previous frame would preferably be used.

Figure 4:
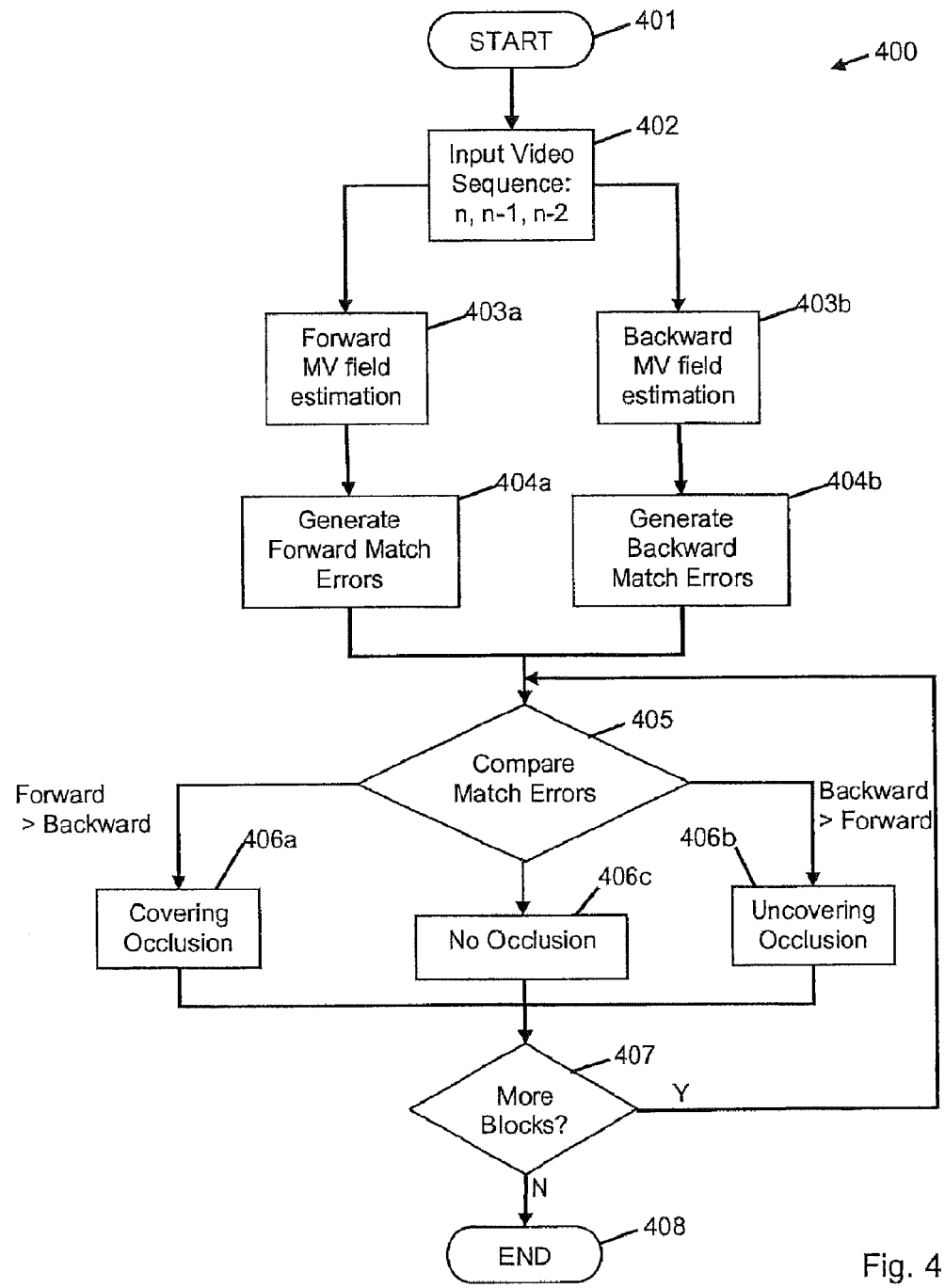
FIG. 4 is a schematic flow diagram illustrating a method of occlusion detection.

FIG. 4 is a schematic flow diagram illustrating a method 400 of determining and identifying occlusion regions in an input video sequence. The method 400 applies to a current set of video frames, n, n−1, n−2, and may be repeated as new frames are input, i.e., n is incremented by 1 and the method is repeated. The method starts (step 401) with and input video sequence comprising input frames n, n−1, n−2 (step 402), i.e., frames 100, 101, 102 of FIGS. 1-3. Forward and backward motion vector estimation is carried out on the input frames. In the exemplary embodiment shown in FIG. 4, forward motion vector estimation (step 403a) is carried out in parallel with backward motion vector estimation (step 403b), although these steps may alternatively be carried out in sequence. For the forward and backward motion vector estimation steps, a corresponding set of forward and backward match errors is generated (steps 404a, 404b).

The results of the forward and backward match errors are compared (step 405), to determine whether the forward match error is greater or smaller than the backward match error for each of the blocks in the set of frames. If the forward match error is greater than the backward match error, the block in question is identified as a covering occlusion region (step 406a). If the backward match error is greater than the forward match error, the block in question is identified as an uncovering occlusion region (step 406b). The difference between the forward and backward match errors preferably needs to be greater than a predefined threshold value. The threshold value may be a fixed value, optimized for any input video sequence, or alternatively may be adjustable according to the properties of the input video stream. If the difference between the forward and backward match errors is smaller than the threshold value, i.e., the match errors are approximately equal to one another, the block is identified as being not an occlusion region (step 406c).

Once the block in question has been identified as either an uncovering occlusion region, a covering occlusion region or a non-occluding region, the process is repeated for the remaining blocks (step 407). Once all the blocks have been characterized, i.e., a field has been determined for the frame in question, the method ends (step 408). Further steps then involve creating the interpolated frame 103 using the occlusion determination resulting from the above method.

Figure 5:
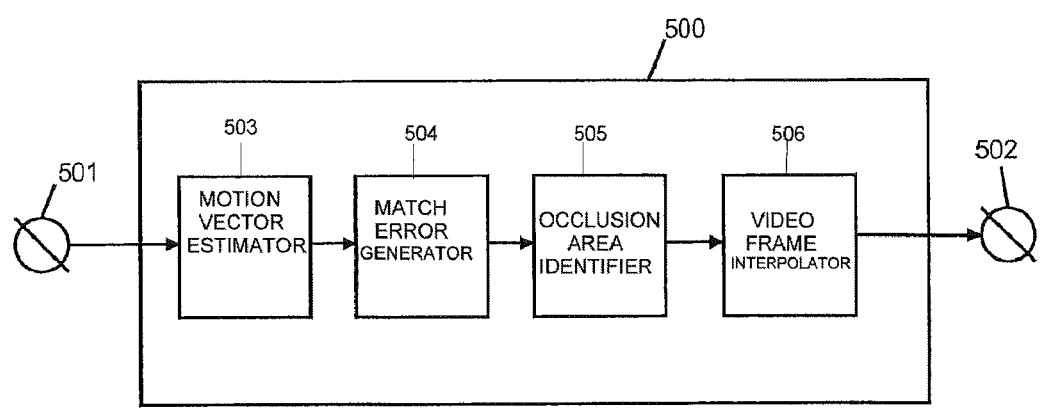
FIG. 5 is a schematic block diagram of an exemplary video frame rate up-converter.

FIG. 5 is a schematic block diagram of a video frame rate up-scaler module 500, configured to take an input video sequence at a video input 501 and provide an up-scaled video sequence at a video output 502. The video up-scaler module 500 comprises a motion vector estimator 503, a match error generator 504, an occlusion area identifier 505 and a video frame interpolator 506. The motion vector estimator 503 comprises a forward and a backward estimator for estimating the required forward and backward estimated motion vector fields for the first previous frame. The match error generator 504 comprises a forward and backward match error generator for generating match errors relating to the forward and backward estimated motion vectors output from the motion vector estimator 503. The occlusion area identifier 505 takes the output from the match error generator 504 and determines for each block whether the block is in an uncovering occlusion area, a covering occlusion area or a non-occlusion area. The output from the occlusion area identifier 505 is then used by the video frame interpolator 506 in generating an intermediate video frame 103 (FIGS. 1-3), which is then output together with the input video frames as an up-scaled video sequence at the output 502.

The video frame-rate up-scaler module 500 may be embodied as a custom module in the form of an application specific integrated circuit (ASIC). The module may alternatively be embodied as software implemented by being executed on a central processing unit or graphical processing unit of a computer. Different parts of the up-scaler module 500 may be implemented on different modules or different physical components of a physical embodiment. Certain modules, for example the motion vector estimator 503 and the match error generator 504 may comprise modules operating in parallel to increase the overall operational speed.

The invention may also be implemented as software loaded on to a programmable microprocessor or computer system. A particular embodiment may comprise a computer program comprising instructions for a computer to execute the above first aspect of the invention. The computer program may be embodied as a computer program product, comprising a computer readable medium that includes executable program instructions, which when executed in a processor/computer cause the processor to execute a method of the invention. Alternatively, the computer program may be in a form distributable by electronic data transmission, comprising computer program code adapted, when the program is loaded onto a processor/computer, to make the processor/computer execute a method of the invention.

Other embodiments are intentionally within the scope of the invention as defined by the appended claims.

What is claimed is:

1. A method of detecting occlusion areas in a sequence of video frames comprising a current frame, a first previous frame and a second previous frame, each frame comprising a plurality of blocks, the method comprising:
    estimating a forward motion vector field for the first previous frame between blocks in the first previous frame and the current frame;
    estimating a backward motion vector field for the first previous frame between blocks in the first previous frame and the second previous frame;
    generating forward match errors between blocks in the first previous frame and blocks in the current frame corresponding with the forward motion vector field;
    generating backward match errors between blocks in the first previous frame and blocks in the second previous frame corresponding with the backward motion vector field;
    identifying blocks in the first previous frame for which the forward match error is greater than the backward match error as covering occlusion areas; and
    identifying blocks in the first previous frame for which the backward match error is greater than the forward match error as uncovering occlusion areas.

2. The method of claim 1 wherein the blocks in the first previous frame are identified as covering occlusion areas when the forward match error is greater than the backward match error by a first threshold value.

3. The method of claim 2 wherein the first threshold value is equal to the second threshold value.

4. The method of claim 2 wherein blocks in the first previous frame are identified as non-occlusion blocks where a magnitude of the difference between the forward and backward match errors is less than the first or second threshold value.

5. The method of claim 1 wherein the blocks in the first previous frame are identified as uncovering occlusion areas when the backward match error is greater than the forward match error by a second threshold value.

6. The method of claim 1 wherein the forward and backward match errors are calculated from a sum of absolute differences between corresponding blocks in the current, first previous and second previous frames.

7. A method of up-converting a video sequence comprising a plurality of frames including a current frame, a first previous frame and a second previous frame, the method comprising:
    identifying uncovering and covering occlusion areas in the first previous frame by estimating a forward motion vector field for the first previous frame between blocks in the first previous frame and the current frame, estimating a backward motion vector field for the first previous frame between blocks in the first previous frame and the second previous frame, generating forward match errors between blocks in the first previous frame and blocks in the current frame corresponding with the forward motion vector field, generating backward match errors between blocks in the first previous frame and blocks in the second previous frame corresponding with the backward motion vector field, identifying blocks in the first previous frame for which the forward match error is greater than the backward match error as covering occlusion areas; and identifying blocks in the first previous frame for which the backward match error is greater than the forward match error as uncovering occlusion areas; and
    performing interpolation between the first previous frame and the current frame to generate an interpolated frame.

8. The method of claim 7 wherein uncovering occlusion areas in the first previous frame are interpolated using blocks in the current frame and covering occlusion areas in the first previous frame are interpolated using blocks in the first previous frame.

9. An image processing apparatus comprising an up-converter for up-converting an input video sequence comprising a current frame, a first previous frame and a second previous frame, each frame comprising a plurality of blocks, the up-converter comprising:
    a forward estimator for estimating a forward motion vector field for the first previous frame between blocks in the first previous frame and the current frame;
    a backward estimator for estimating a backward motion vector field for the first previous frame between blocks in the first previous frame and the second previous frame;
    a forward match error generator for generating forward match errors between blocks in the first previous frame and blocks in the current frame corresponding with the forward motion vector field;
    a backward match error generator for generating backward match errors between blocks in the first previous frame and blocks in the second previous frame corresponding with the backward motion vector field;

a first identifier for identifying blocks in the first previous frame for which the forward match error is greater than the backward match error as covering occlusion areas; and a second identifier for identifying blocks in the first previous frame for which the backward match error is greater than the forward match error as uncovering occlusion areas.

* * * * *